US008370845B1

(12) United States Patent
Le Grand

(10) Patent No.: US 8,370,845 B1
(45) Date of Patent: Feb. 5, 2013

(54) METHOD FOR SYNCHRONIZING INDEPENDENT COOPERATIVE THREAD ARRAYS RUNNING ON A GRAPHICS PROCESSING UNIT

(75) Inventor: Scott M. Le Grand, Soquel, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1579 days.

(21) Appl. No.: 11/836,024

(22) Filed: Aug. 8, 2007

(51) Int. Cl.
*G06F 9/46* (2006.01)

(52) U.S. Cl. ........................................................ 718/106

(58) Field of Classification Search ................... 718/106
See application file for complete search history.

(56) References Cited

U.S. PATENT DOCUMENTS

| | | | | |
|---|---|---|---|---|
| 5,519,877 | A * | 5/1996 | Yoneda et al. | 713/375 |
| 5,949,716 | A * | 9/1999 | Wong et al. | 365/185.29 |
| 6,418,478 | B1 | 7/2002 | Ignatius et al. | |
| 6,519,623 | B1 | 2/2003 | Mancisidor | |
| 6,826,752 | B1 | 11/2004 | Thornley et al. | |
| 6,862,635 | B1 | 3/2005 | Alverson et al. | |
| 6,941,379 | B1 * | 9/2005 | Dingsor et al. | 718/104 |
| 7,293,200 | B2 | 11/2007 | Neary et al. | |
| 7,512,950 | B1 | 3/2009 | Marejka | |
| 2005/0108720 | A1 | 5/2005 | Cervini | |
| 2006/0085679 | A1 * | 4/2006 | Neary et al. | 714/13 |
| 2006/0212868 | A1 | 9/2006 | Takayama et al. | |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.
Office Action, U.S. Appl. No. 11/836,017 dated Dec. 23, 20010.
Office Action, U.S. Appl. No. 11/836,017 dated Feb. 1, 2012.

* cited by examiner

*Primary Examiner* — Li B Zhen
*Assistant Examiner* — Bradford Wheaton
(74) *Attorney, Agent, or Firm* — Patterson & Sheridan, LLP

(57) ABSTRACT

One embodiment of the present invention sets forth a technique for synchronizing the execution of multiple cooperative thread arrays (CTAs) implementing a parallel algorithm that is mapped onto a graphics processing unit. An array of semaphores provides synchronization status to each CTA, while one designated thread within each CTA provides updated status for the CTA. The designated thread within each participating CTA reports completion of a given computational phase by updating a current semaphore within the array of semaphores. The designated thread then polls the status of the current semaphore until all participating CTAs have reported completion of the current computational phase. After each CTA has completed the current computational phase, all participating CTAs may proceed to the next computational phase.

16 Claims, 10 Drawing Sheets

500

Initialize 510
Pass 1 512
Sync Threads 514
(threadIdx.x==0)? 516
Yes → Atomic Add 520
Semaphore Wait 522
(blockIdx.x==0)? 524
Yes → Zero Next Semaphore 526
No → Increment Semaphore Index 528
No → Sync Threads 530
Pass 2 540
Done 550

METHOD FOR SYNCHRONIZING INDEPENDENT COOPERATIVE THREAD ARRAYS RUNNING ON A GRAPHICS PROCESSING UNIT

BACKGROUND OF THE INVENTION

1. Field of the Invention

Embodiments of the present invention relate generally to parallel processing and more specifically to a method for synchronizing independent cooperative thread arrays running on a graphics processing unit.

2. Description of the Related Art

A typical computer system includes, without limitation, a central processing unit (CPU), a graphics processing unit (GPU), a display device, and one or more input devices. A software application may execute on the CPU, or the software application may be distributed between the CPU and the GPU. A user may interact with the software application executing within the computer system by operating at least one input device and observing the results on the display device. The CPU usually executes the overall structure of the software application and configures the GPU to perform specific tasks. In current technology, the CPU tends to offer more general functionality using a relatively small number of large execution threads, while the GPU is capable of very high performance using a relatively large number of small, parallel execution threads on dedicated hardware processing units. The execution model for threads within the GPU may include blocks of related threads, called cooperative thread arrays (CTAs), generally executing under a single-instruction, multiple-data (SIMD) regime. The GPU thread execution model may also allow for multiple, independently executing CTAs, providing a very high computational throughput.

In conventional computer systems, the CPU assigns specific computational work to CTAs within the GPU. When each CTA completes the work, the GPU generates an interrupt to the CPU. Highly parallel algorithms may advantageously assign work to many simultaneously executing CTAs within the GPU. As the CTAs complete assigned work, the CTAs may need to be synchronized. That is, certain CTAs may need to wait for other CTAs to finish before starting on subsequent computations. Some complex functions may require multiple CTA synchronization checkpoints prior to completion, each requiring an interrupt to the CPU. However, each repetitive interrupt may be detrimental to system performance, and a large number of CTAs generating repetitive interrupts may be crippling to the performance of certain complex algorithms.

One approach to reducing the impact of the interrupt service time is to improve the interrupt performance of the host operating system. However, interrupt performance is established by the specific operating system design, with little chance of modification or improvement beyond existing design requirements. Furthermore, CTA synchronization may generate a much larger volume of interrupt traffic than the customary design requirements of a standard operating system. With GPU performance increasing in successive product generations, the interrupt performance of a given operating system is, therefore, likely to constrain the maximum possible throughput of advanced CTA-based algorithms.

As the foregoing illustrates, what is needed in the art is a technique for performing efficient cooperative thread array synchronization.

SUMMARY OF THE INVENTION

One embodiment of the present invention sets forth a method for synchronizing a plurality of cooperative thread arrays (CTAs) executing an algorithm within a parallel processing system, where the plurality of CTAs includes a first CTA. The method includes the steps of (i) for a first plurality of threads within the first CTA, performing a first set of computations associated with a first pass of the algorithm, (ii) performing a thread synchronization operation across the first plurality of threads to ensure that all threads within the first CTA have completed the first set of computations, and (iii) for a first thread within the first CTA, performing an atomic add operation to increment a first semaphore to indicate that all threads within the first CTA have completed the first set of computations.

One advantage of the disclosed method is that it provides a technique for synchronizing CTAs that does not involve a driver or processor interrupts and, therefore, is substantially more efficient than prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
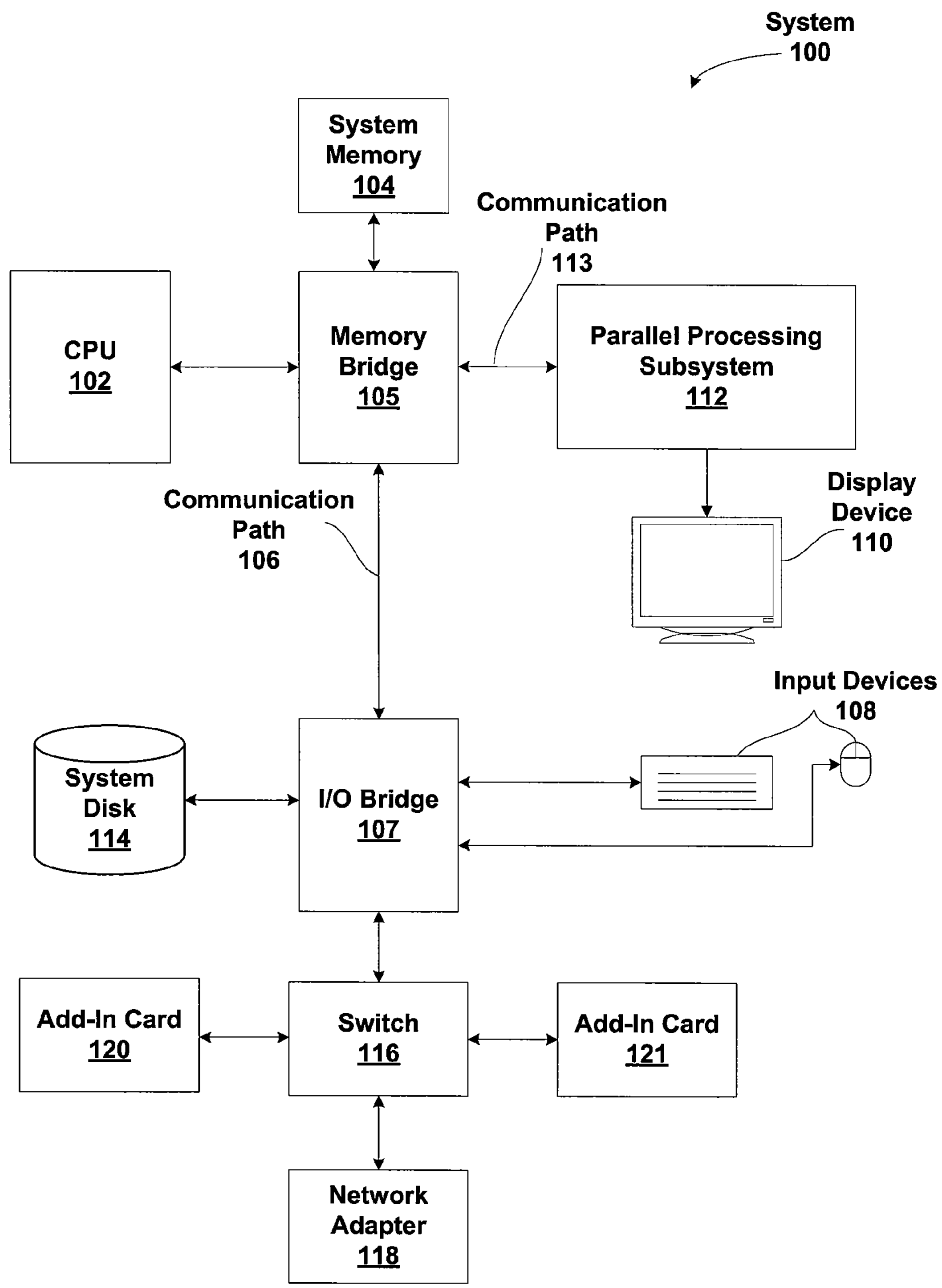
FIG. 1 is a block diagram illustrating a computer system configured to implement one or more aspects of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
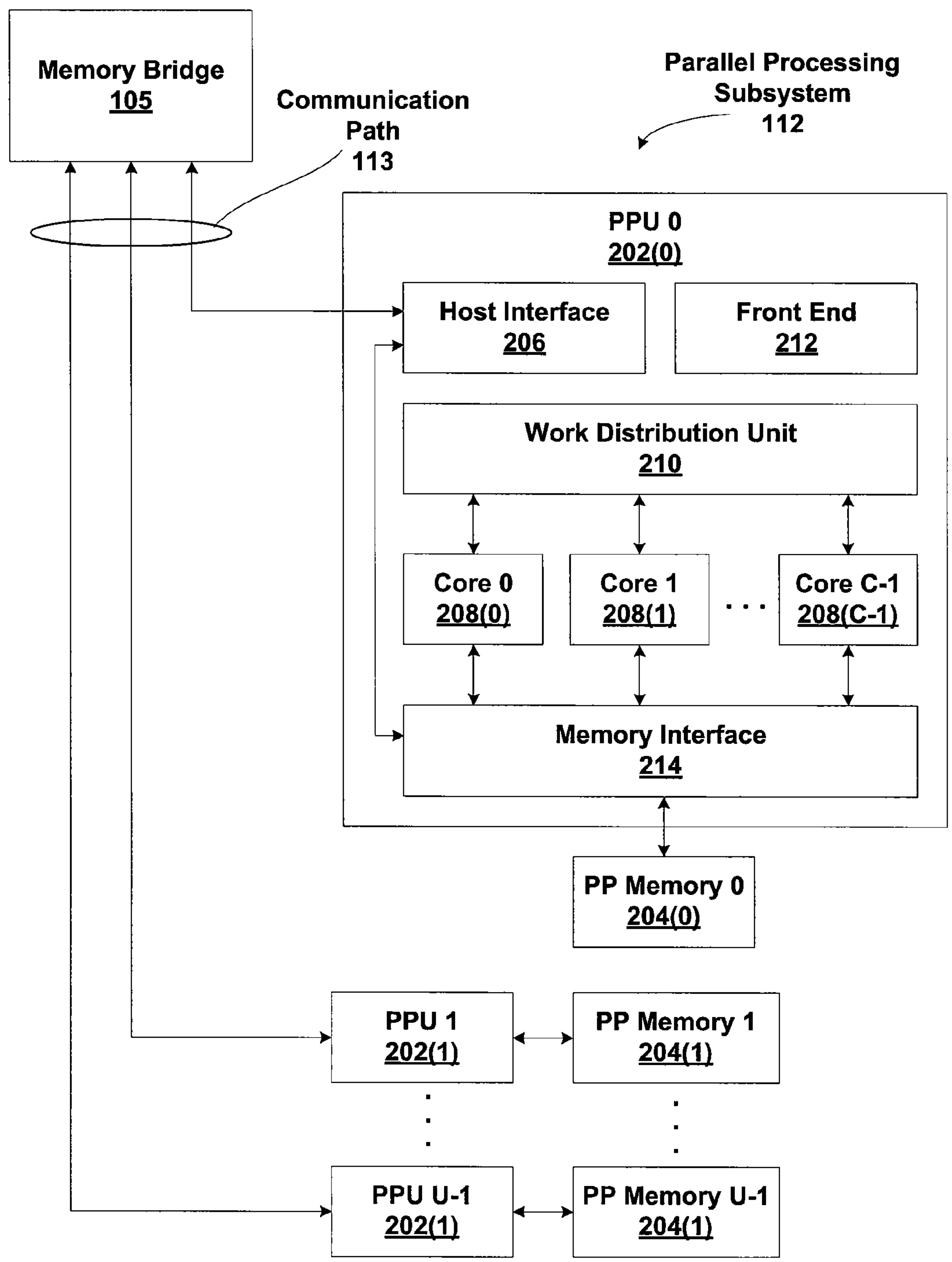
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
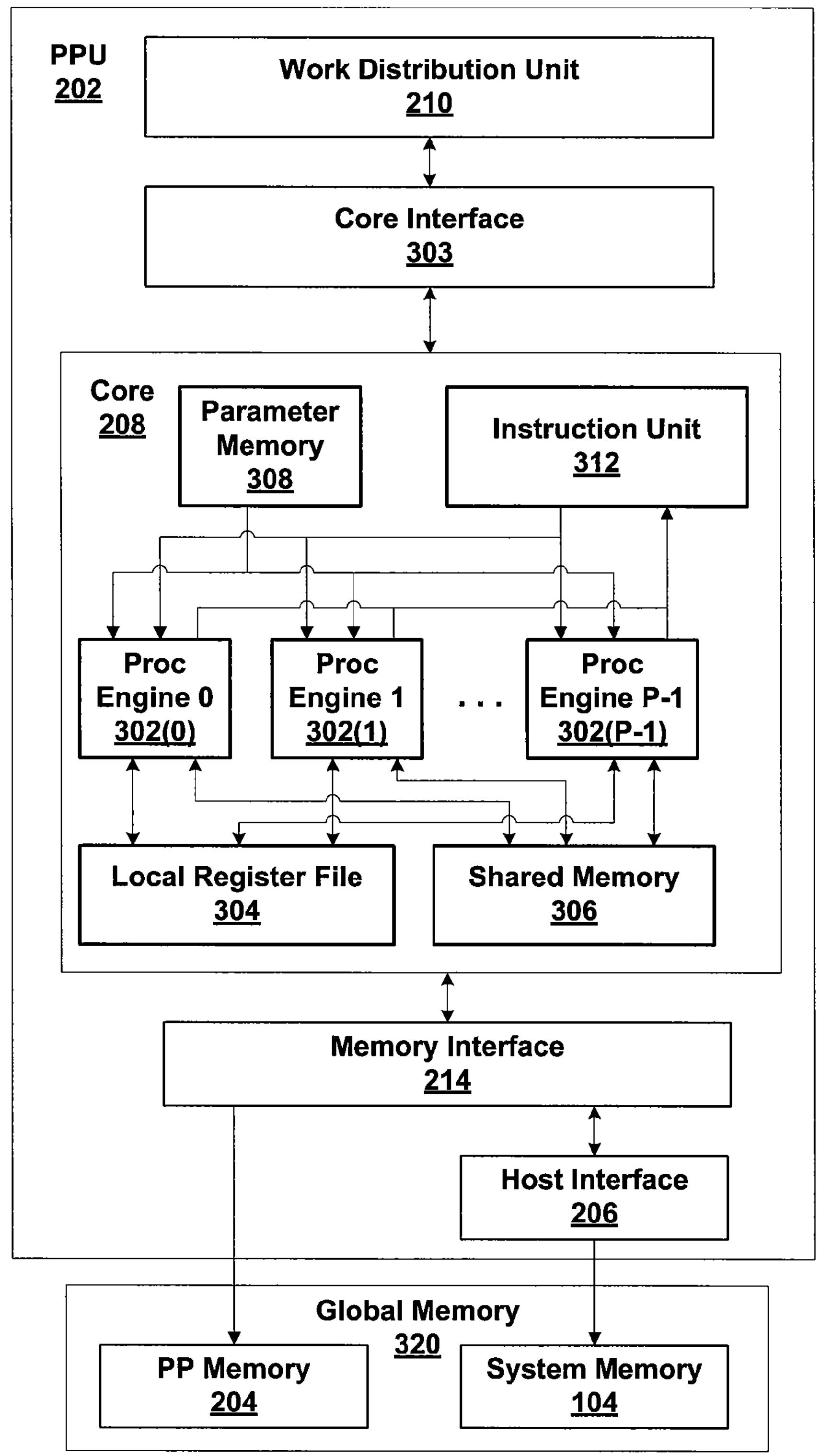
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (n0) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Methods for Synchronizing Independent CTAs on a GPU

Figure 4A:
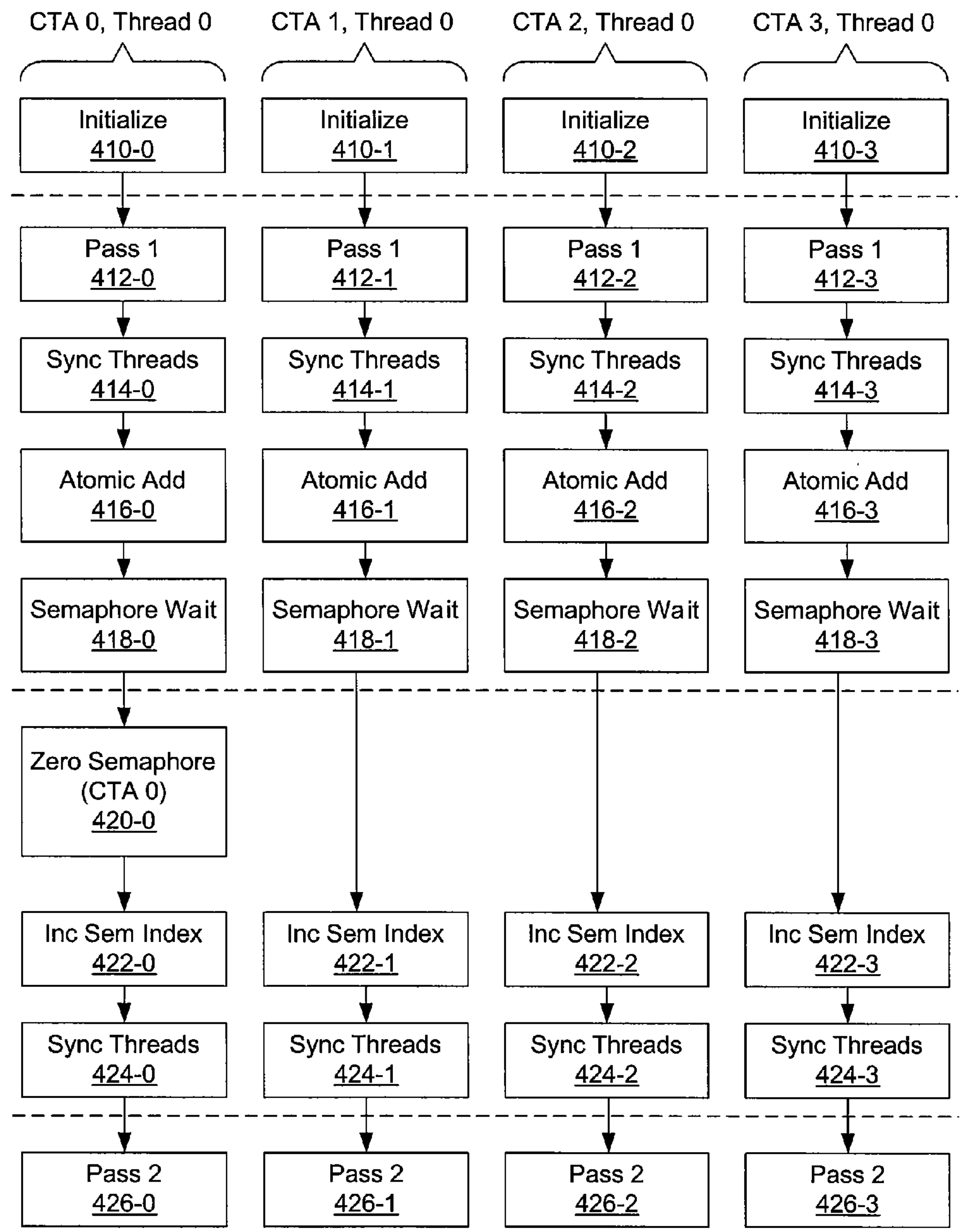
FIG. 4A illustrates cooperative thread array synchronization using a one-dimensional semaphore array, according to one embodiment of the invention.

FIG. 4A illustrates cooperative thread array synchronization using a one-dimensional semaphore array, according to one embodiment of the invention. The semaphore array (not shown) includes at least three elements, where a number can be stored in each element and an atomic add operation may be performed on each element. Access to a specific element is provided through a semaphore index. The current semaphore is determined by the current value of the semaphore index. Each CTA may include an instance of the semaphore index, and all CTAs participating in the algorithm share access to the semaphore array. For example, the semaphore array may include storage for four integer values. One of the four integer values may be selected as the current semaphore for reading, writing, or performing atomic adds. The semaphore index may also be an integer value.

The CTA synchronization process is illustrated in the context of two computation phases for an algorithm mapped onto the CTAs for execution, shown as pass 1 412 and pass 2 426. After an initialization phase, "initialize" 410, a first set of computations associated with pass 1 412 of the algorithm may be performed by any CTA. After pass 1 412 is completed for thread zero of a CTA, a synchronize threads operation 414 is performed over all threads within that CTA to ensure that all threads also performing pass 1 412 within the CTA have also completed. After the synchronize threads operation 414, thread zero within a CTA performs an atomic add operation 416 to the current semaphore. In a semaphore wait operation 418, thread zero of a CTA polls the value of the current semaphore until the value of the current semaphore indicates that every CTA has performed the atomic operation 416 once, and thereby confirming that every CTA has completed the computations of pass 1.

After the semaphore wait operation 418 completes for all CTAs, one predefined thread from one predefined CTA prepares a subsequent semaphore for use in a future synchronization operation by performing a zero (clear) semaphore operation 420-0. In one embodiment, this operation is performed on a semaphore two steps ahead of the current semaphore. For example, thread zero of CTA zero may serve as the predefined thread configured to write a zero the semaphore two steps ahead of the current semaphore. The semaphore one step ahead of the current semaphore should already be zero and ready for use at this point. Addressing the semaphore array should use a modulo increment operation, which causes the current semaphore value to cycle through a range of possible address values. For example, if the semaphore array includes four elements, then incrementing the semaphore index results in the sequence 0, 1, 2, 3, 0, 1, 2, 3, and so forth.

After the semaphore wait operation 418 completes, thread zero of each CTA performs an increment operation 422 on the semaphore index on the related instance of the semaphore index. A second synchronize threads operation 424 is then performed over all threads within each CTA, thereby assuring that the threads within a given CTA start executing together. After the synchronize threads operation 424, each thread within each CTA is properly synchronized and ready to begin executing a second set of computations associated with pass 2 426 of the algorithm.

Figure 4B:
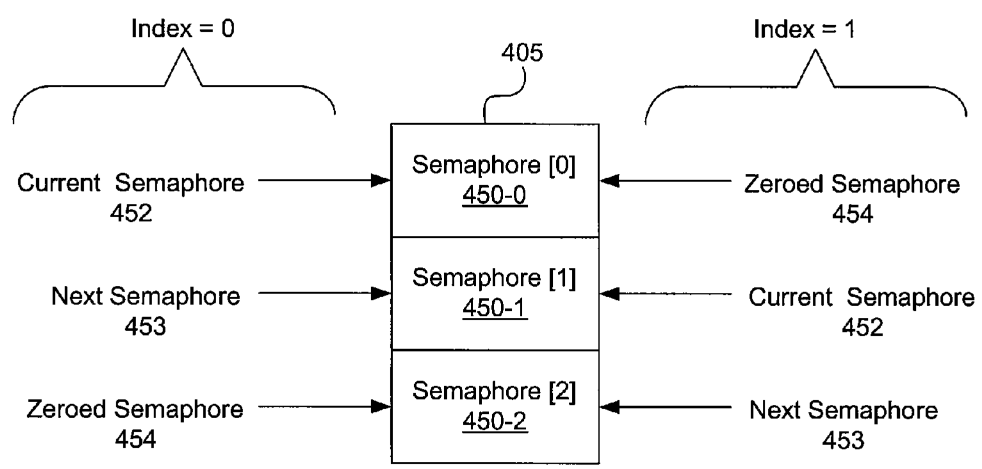
FIG. 4B illustrates a one-dimensional semaphore array with three semaphores, according to one embodiment of the invention.

FIG. 4B illustrates a one-dimensional semaphore array 405 with three semaphores 450, according to one embodiment of the invention. In an initial configuration, the semaphore index is zero, establishing the current semaphore 452 to be semaphore 450-0 within the array of semaphores. A next semaphore 453, corresponding to semaphore 450-1, is available for use as a subsequent current semaphore. A zeroed semaphore 454, situated after the next semaphore 453, is set to zero at the end of the current synchronization phase. After the current synchronization operation, the semaphore index is incremented to a value of one, causing the current semaphore 452 to be semaphore 450-1, within the semaphore array. With the semaphore index equal to one, the next semaphore 453 is semaphore 450-2 and the zeroed semaphore 454 is semaphore 450-0. As the semaphore index is incremented, the current semaphore 452, next semaphore 453 and zeroed semaphore 454 rotate in correspondence to the semaphore array 405. A minimum size semaphore array needed to implement the techniques described herein included three elements and requires the modulo operator to compute index values. Because the modulo operator is a relatively expensive operation in some architectures and one additional storage element is relatively inexpensive, different embodiments may implement the semaphore array with a more convenient number of elements. For example, a semaphore array with four elements may use simple addition and truncation to compute index values.

Figure 4C:
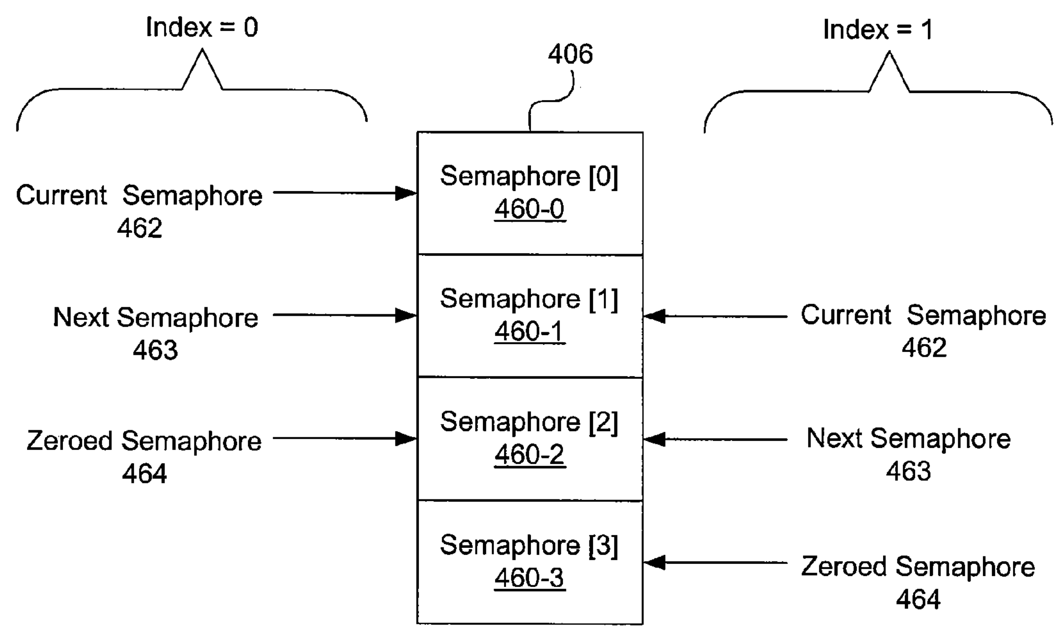
FIG. 4C illustrates a one-dimensional semaphore array with four semaphores, according to one embodiment of the invention.

FIG. 4C illustrates a one-dimensional semaphore array 406 with four semaphores 460, according to one embodiment of the invention. The correspondence of the current semaphore 462, next semaphore 463, and zeroed semaphore 464 relative to the semaphore array 406 follows closely the description of FIG. 4B, with the exception that semaphore array 406 includes four elements, semaphores 460, rather than three elements.

Figure 5:
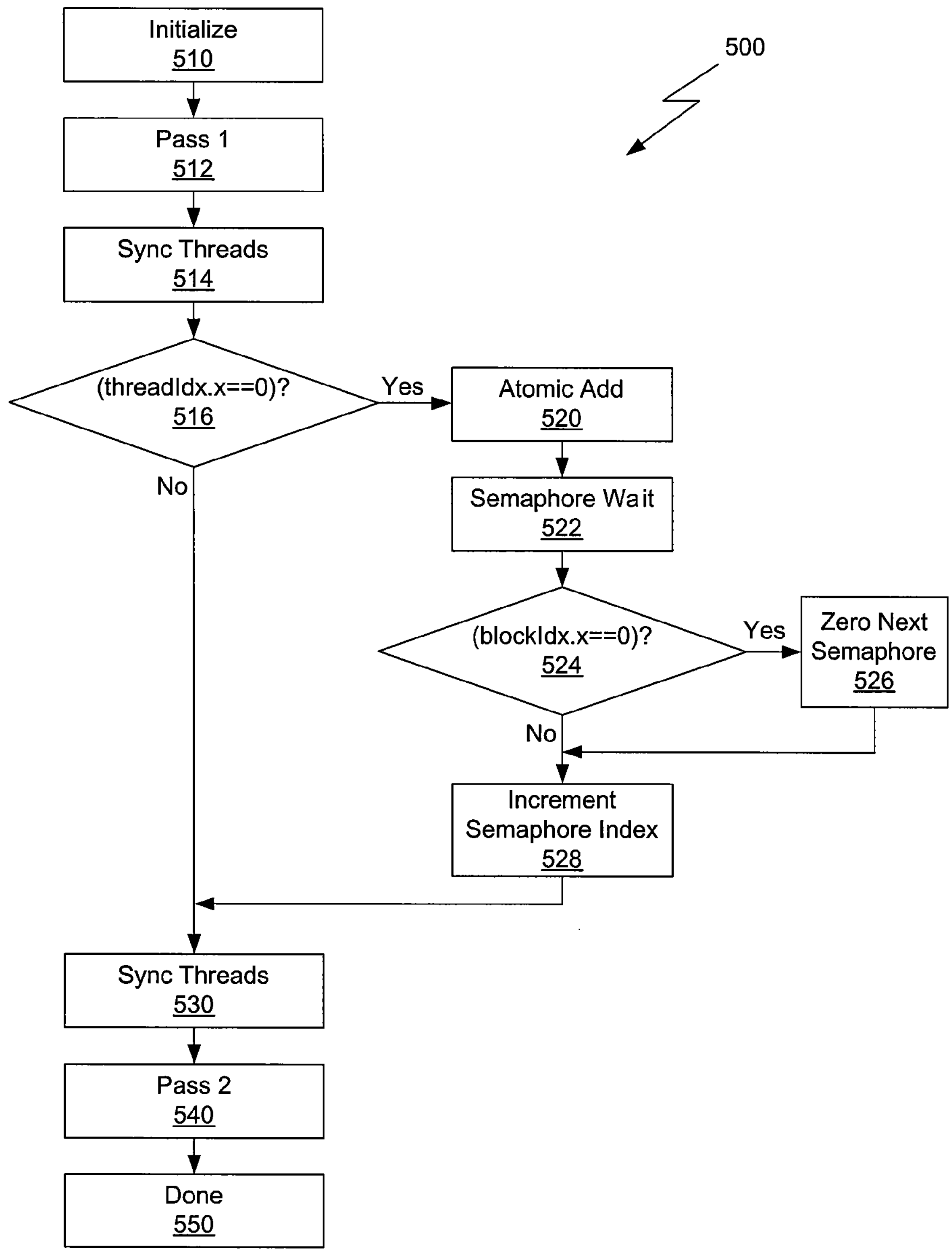
FIG. 5 is a flow diagram of method steps for synchronizing a plurality of cooperative thread arrays using atomic add operations and a one-dimensional semaphore array, according to one embodiment of the invention.

FIG. 5 is a flow diagram of method steps 500 for synchronizing a plurality of cooperative thread arrays using atomic add operations and a one-dimensional semaphore array, according to one embodiment of the invention. Although the method steps are described in conjunction with the systems of FIGS. 1, 2 and 3, persons skilled in the art will understand that any system that performs the method steps, in any order, is within the scope of the invention. Furthermore, although the method steps describe the actions of a single executing thread within a CTA, persons skilled in the art will understand that multiple, unique instances of the thread may be concurrently executing in multiple independent CTAs.

The method uses a first well-known system variable, referred to as "threadldx.x," in performing certain branching decisions. This variable provides a thread identifier for the thread executing a read from the variable, allowing individual threads within a CTA to make unique branching decisions, based on individual thread identifier numbers. The method also uses a second well-known system variable, referred to as "blockldx.x," which provides a CTA identifier for the thread executing a read from the variable, allowing threads within a CTA to make branching decisions based on the CTA identifier number.

The method begins in step 510, where a thread within a CTA initializes related computation state. For example, each element of the semaphore array may be initialized to zero. In step 512, a thread performs pass 1 computations, as defined by the specific algorithm executing on the CTA. In step 514, the thread participates in a synchronize threads operation to align the execution state of all related threads within the CTA. Step 514 has the effect of causing every related thread within the CTA to wait for every other related thread to finish the pass 1 computations. If, in step 516, threadldx.x is equal to zero, the method proceeds to step 520, where the thread performs an atomic add operation to the current semaphore. In step 522, the thread performs a semaphore wait, which includes periodically polling the current semaphore value and waiting until the value is equal to the number of CTAs participating in the algorithm. Once the value of the current semaphore is equal to the number of CTAs participating in the algorithm, each thread within each CTA has completed the pass 1 computations and is ready to proceed. If, in step 524, blockldx.x is equal to zero, the method proceeds to step 526, where thread zero of the CTA sets a next semaphore to zero. In step 528, the thread increments the semaphore index to establish a new current semaphore that has been previously set to zero. In step 530, the thread participates in a synchronize threads operation to align the execution state of all related threads within the CTA. After step 530 completes, the threads executing within the CTA are synchronized and ready to perform the next phase of computation. In step 540, the thread performs pass 2 computations, as defined by the specific algorithm executing on the CTA. The method terminates in step 550. Returning now to step 524, if blockldx.x is not equal to zero, the method proceeds to step 528. Returning now to step 516, if threadldx.x is not equal to zero, the method proceeds to step 530.

Figure 6A:
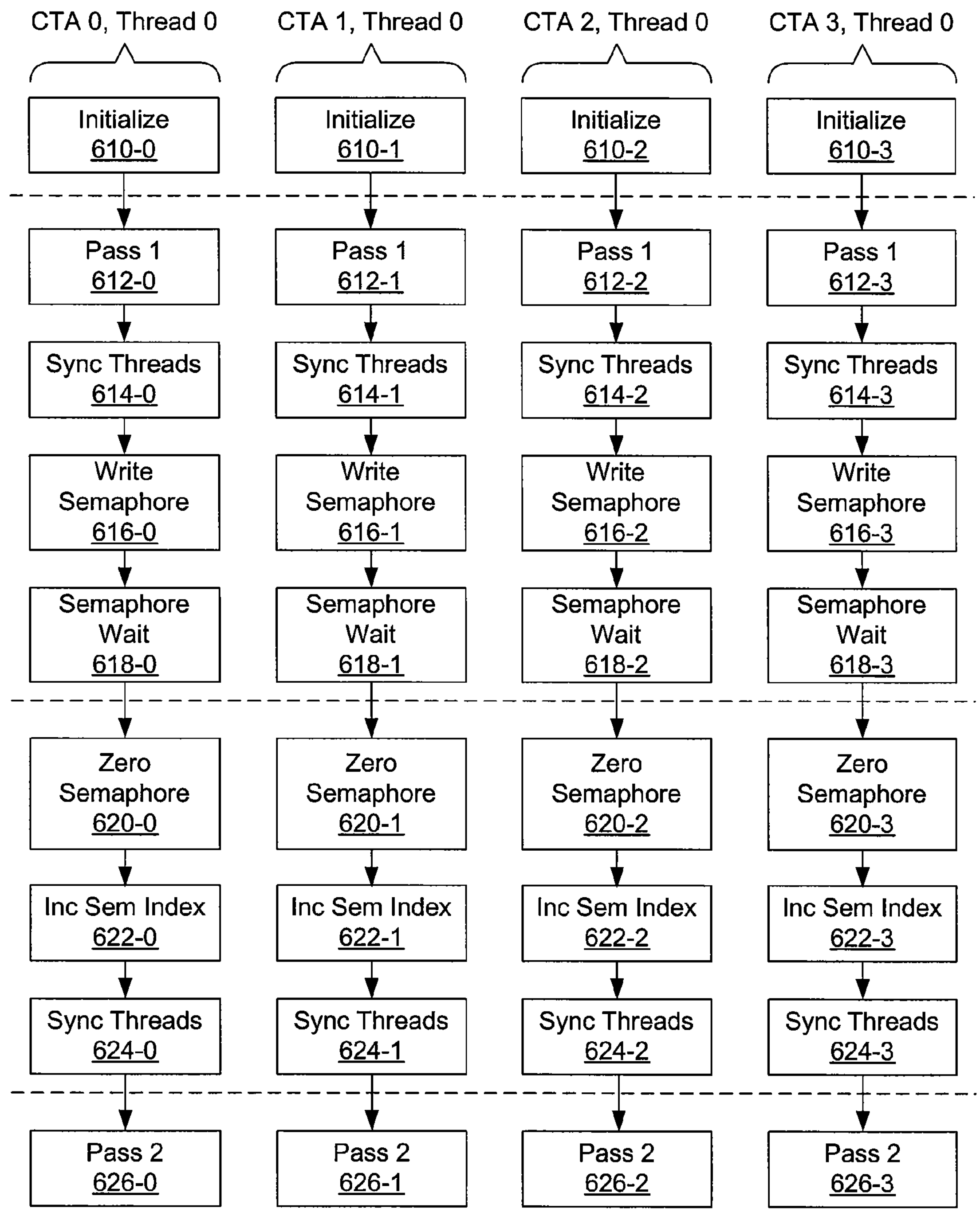
FIG. 6A illustrates cooperative thread array synchronization using a two-dimensional semaphore array, according to another embodiment of the invention.

FIG. 6A illustrates cooperative thread array synchronization using a two-dimensional semaphore array, according to one embodiment of the invention. The array is sized in the first dimension (columns) according to the number of participating CTAs and sized in the second dimension (rows) to accommodate three or more elements per participating CTA. Each array may include two indices for selecting an element within the array. Access to a specific element within the semaphore array is provided using a CTA number, to select a column, and a semaphore index, to select a row. In one embodiment, the array is sized in the second dimension (rows) to accommodate four elements per participating CTA.

Each CTA includes a current semaphore, which is determined by the CTA number and a current semaphore index value. One of the four integer values may be selected as the current semaphore for reading and writing. The semaphore index may be an integer value. Any thread from any CTA may read any value within the semaphore array. However, when a thread writes to the semaphore array, access is restricted to a row within the corresponding CTA number.

The CTA synchronization process is illustrated in the context of two computation phases for an algorithm mapped onto the CTAs for execution, shown as pass 1 612 and pass 2 626. After an initialization phase, "initialize" 610, a first set of computations associated with pass 1 612 may be performed by any CTA. After pass 1 612 is completed for thread zero of a CTA, a synchronize threads operation 614 may be performed over all threads within each CTA to ensure that all threads also performing pass 1 612 within the CTA have also completed. After the synchronize threads operation 614, thread zero within a CTA performs a write semaphore operation 616 to the current semaphore for the associated CTA. The write semaphore operation 616 may include writing a "1" to the corresponding current semaphore.

In a semaphore wait operation 618, thread zero of each CTA polls the value of the current semaphore for each corresponding CTA until a condition is satisfied, whereby the sum of values of the current semaphores indicates that every CTA has written the corresponding current semaphore. After this condition has been satisfied, thread zero within each CTA performs a zero semaphore operation 620 to zero the semaphore two increments ahead. The semaphore one step ahead of the current semaphore should already be zero and ready for use at this point.

After the zero semaphore operation 620 completes, thread zero of each CTA performs an increment semaphore index operation 622 on the related instance of the semaphore index. Another synchronize threads operation 624 should be performed after the semaphore wait operation 418, thereby assuring that the threads within a given CTA start executing together. After the synchronize threads operation 624, each thread within each CTA is properly synchronized and ready to begin executing a second set of computations associated with pass 2 626 of the algorithm.

Figure 6B:
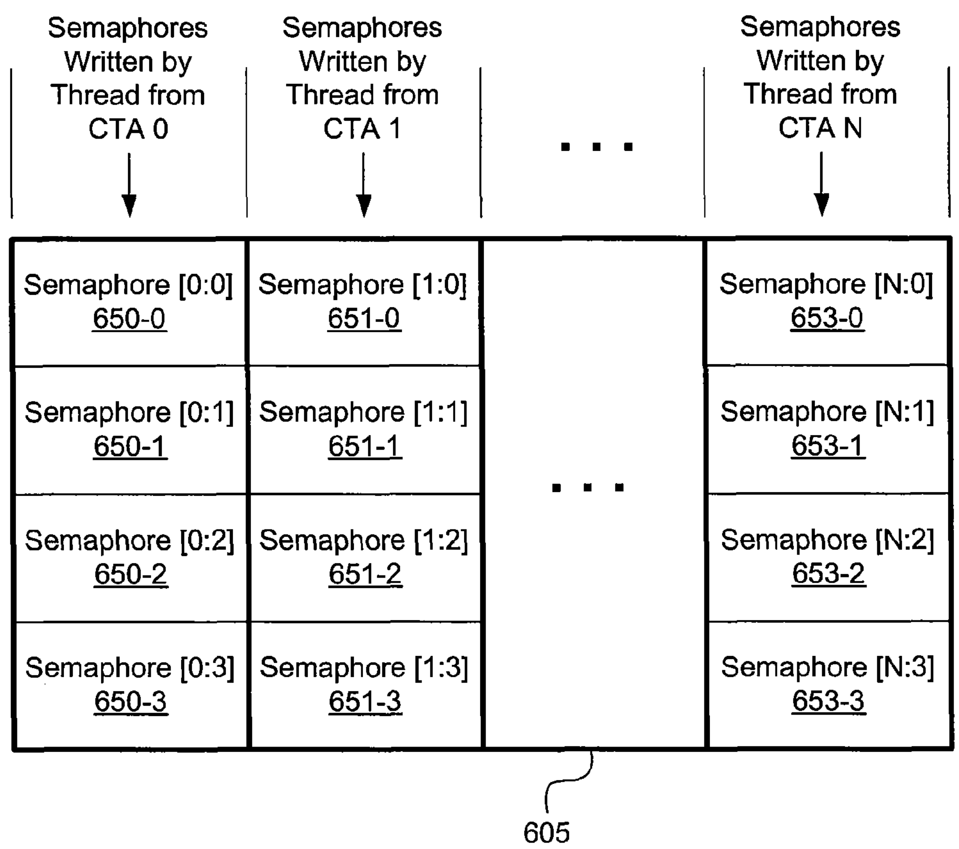
FIG. 6B illustrates a two-dimensional semaphore array, according to one embodiment of the invention.

FIG. 6B illustrates a two-dimensional semaphore array 605, according to one embodiment of the invention. The two-dimensional semaphore array 605 includes four rows and as many vertical columns as participating CTAs. Each CTA may write within one corresponding column, and read from any row within the semaphore array 605. For example, CTA 0 may write semaphores 650, CTA 1 may write semaphores 651, and so on. When the semaphore index is zero, CTA 0 writes to semaphore 650-0 when all threads within CTA 0 have completed the current computation tasks. To perform the semaphore wait operation 618, thread 0 of CTA 0 reads each member of the row specified by the semaphore index and adds up the values within the row. Continuing the example with the semaphore index equal to zero, CTA 0 would then read semaphore 651-0 through 653-0 to compute the number of CTAs that are finished with the current computation tasks.

Figure 7:
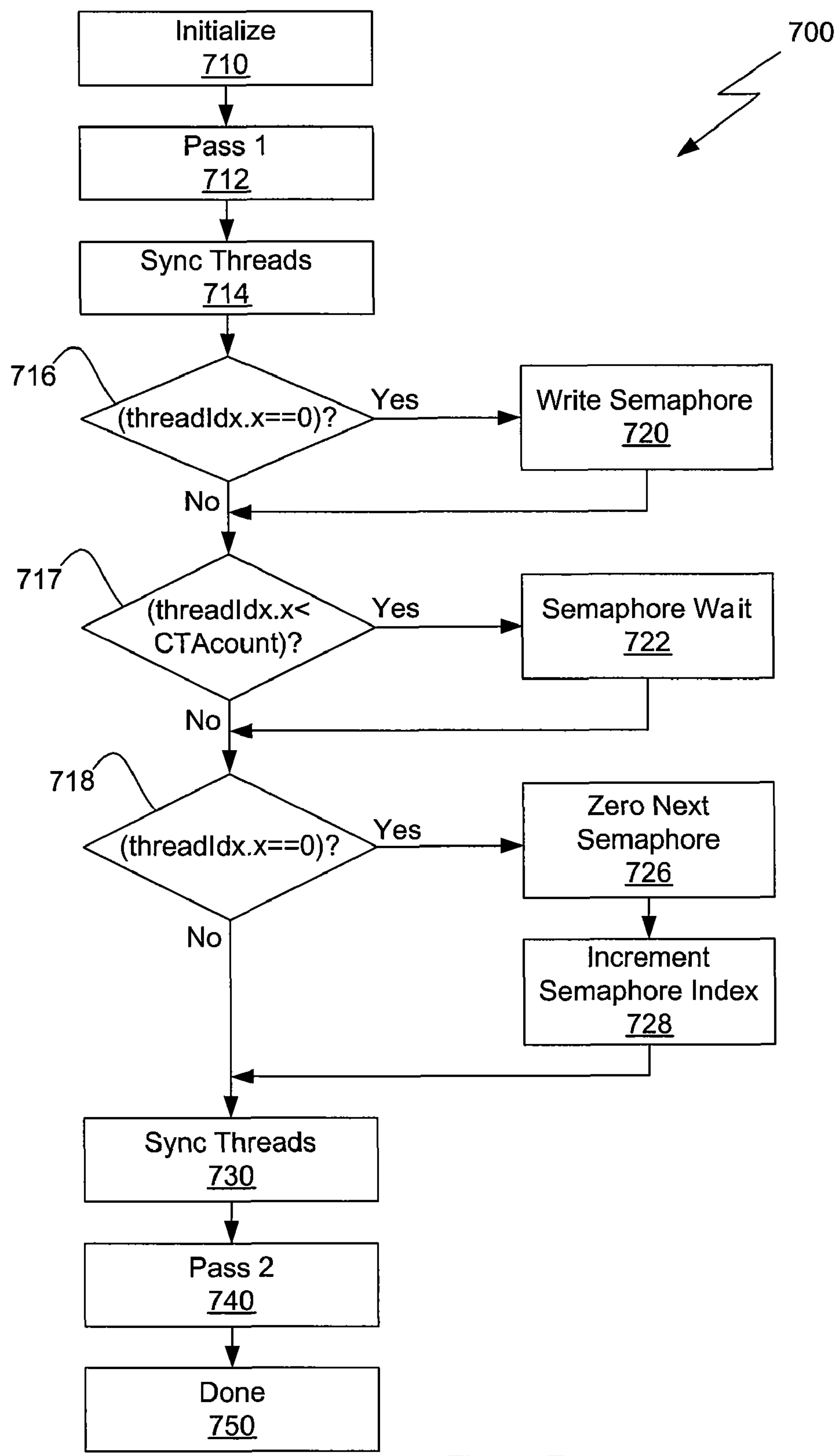
FIG. 7 is a flow diagram of method steps for synchronizing cooperative thread arrays using a two-dimensional semaphore array, according to one embodiment of the invention.

FIG. 7 is a flow diagram of method steps 700 for synchronizing cooperative thread arrays using a two-dimensional semaphore array, according to one embodiment of the invention. Although the method steps are described in conjunction with the systems of FIGS. 1, 2 and 3, persons skilled in the art will understand that any system that performs the method steps, in any order, is within the scope of the invention. Furthermore, although the method steps describe the actions of a single executing thread within a CTA, persons skilled in the art will understand that multiple, unique instances of the thread may be concurrently executing in multiple independent CTAs.

As before, this method uses the well-known system variable "threadldx.x," described above in FIG. 5.

The method begins in step 710, where a thread within a CTA initializes related computation state. For example, each element of the semaphore array may be initialized to zero. In step 712, a thread performs pass 1 computations, as defined by the specific algorithm executing on the CTA. In step 714, the thread participates in a synchronize threads operation to align the execution state of all related threads within the CTA. Step 714 has the effect of causing every related thread within the CTA to wait for every other related thread to finish the pass 1 computations.

If, in step 716, threadldx.x is equal to zero, the method proceeds to step 720, where the thread performs a write operation to the current semaphore. In writing the semaphore, the thread is advertising completion status to other threads. Referring back to step 716, if threadldx.x is not equal to zero, the method proceeds to step 717.

If, in step 717, threadldx.x is less than CTA count (the number of participating CTAs), the method proceeds to step 722, where a subgroup of threads perform a semaphore wait. The semaphore wait includes periodically polling the current semaphore values for each CTA and waiting until the sum of the values is equal to the number of CTAs participating in the algorithm. Once the sum of the values is equal to the number of CTAs participating in the algorithm, each thread within each CTA has completed the required pass 1 computations and is ready to proceed. Referring back to step 717, if threadldx.x is not less than the number of participating CTAs, the method proceeds to step 718.

If, in step 718, threadldx.x is equal to zero, the method proceeds to step 726. In step 726, thread zero of each CTA sets a next semaphore to zero. In step 728, thread zero of each CTA increments the respective semaphore index to establish a new current semaphore for the CTA that has been previously set to zero. Referring back to step 718, if threadldx.x is not equal to zero, the method proceeds to step 730.

In step 730, the thread participates in a synchronize threads operation to align the execution state of all related threads within the CTA. After step 730 completes, the threads executing within the CTA are synchronized and ready to perform the next phase of computation. In step 740, the thread performs pass 2 computations, as defined by the specific algorithm executing on the CTA. The method terminates in step 750.

In sum, a technique is disclosed for synchronizing the execution of independent CTAs running on a graphics processing unit. In a first embodiment, a one-dimensional array of semaphores is used to synchronize the progress of each thread. One element of the array of semaphores acts as the current semaphore used to synchronize execution among participating CTAs. One designated thread from one designated CTA clears elements of the array of semaphores for new synchronization activity. One designated thread from each CTA performs an atomic add to the current semaphore, indicating completion of the current computation phase within that CTA. After all participating CTAs have completed the current computation phase and performed an atomic add to the semaphore, the value stored in the semaphore should be equal to the number of participating CTAs. After the designated thread within the CTA performs the atomic add to the current semaphore, the designated thread then polls the current semaphore until the value of the semaphore is equal to the number of participating CTAs. When this condition is met, each CTA can proceed to a subsequent computation phase.

In the second embodiment, a two-dimensional array of semaphores is used to synchronize the progress of each CTA. The first dimension of the array is associated with a CTA number, while one selected element in the second dimension is used to indicate the status of each CTA. One designated thread from each CTA manages the elements along the second dimension of the array or semaphores corresponding to that CTA number. When a given CTA completes a current computation phase, the corresponding designated thread writes a flag, such as a "1," to the current semaphore corresponding to the CTA number. After the designated thread within the CTA performs this write operation to the appropriate current semaphore, a subgroup of threads polls the current semaphore values for each participating CTA and adds up the number of completed flags. When the number of completed flags is equal to the number of participating CTAs, each CTA may proceed to a subsequent computation phase. Importantly, this second embodiment does not require an atomic add for proper execution and is therefore suitable for applications where an atomic add is not available.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

I claim:

1. A method for synchronizing a plurality of cooperative thread arrays (CTAs) executing an algorithm within a parallel processing system, wherein the plurality of CTAs includes a first CTA, the method comprising:

for a first plurality of threads within the first CTA, performing a first set of computations associated with a first pass of the algorithm;

performing a thread synchronization operation across the first plurality of threads to ensure that all threads within the first CTA have completed the first set of computations; and for a first thread within the first CTA, incrementing a value stored in a unique location associated with each CTA in the plurality of CTAs within a semaphore array when all threads within the first CTA have completed the first set of computations, wherein the value stored in the unique location indicates the number of CTAs included in the plurality of CTAs that have completed the first pass of the algorithm, and wherein a subgroup of threads within the first CTA and a subgroup of threads within each of the other CTAs in the plurality of CTAs polls the unique location to determine whether all threads within all CTAs have completed the first set of computations.

2. The method of claim 1, wherein the steps of performing the first set of computations, performing a thread synchronization operation, and writing a value to a unique location within the semaphore array are conducted by one or more threads within each of the other CTAs in the plurality of CTAs.

3. The method of claim 2, further comprising the step of, for each CTA, performing a semaphore wait operation to ensure that all threads within all CTAs have completed the first set of computations.

4. The method of claim 3, further comprising the step of, for the first thread in each CTA, performing a zero semaphore operation to clear another unique location in the semaphore array for another set of computations associated with the algorithm.

5. The method of claim 4, wherein the another unique location within the semaphore array is two increments ahead of the unique location within the semaphore array in a semaphore index.

6. The method of claim 3, further comprising the step of, for the first thread within each CTA, incrementing a semaphore index to make another unique location within the semaphore array available for a second set of computations associated with the algorithm.

7. The method of claim 6, further comprising the step of, for each CTA, performing a thread synchronization operation across all threads.

8. The method of claim 7, further comprising the step of, for a second plurality of threads within each CTA, performing the second set of computations.

9. A non-transitory computer-readable medium including instructions that, when executed by a processing unit, cause the processing unit to synchronize a plurality of cooperative thread arrays (CTAs) executing an algorithm and including a first CTA, by performing the steps of:

for a first plurality of threads within the first CTA, performing a first set of computations associated with a first pass of the algorithm;

performing a thread synchronization operation across the first plurality of threads to ensure that all threads within the first CTA have completed the first set of computations; and for a first thread within the first CTA, incrementing a value stored in a unique location associated with each CTA in the plurality of CTAs within a semaphore array when all threads within the first CTA have completed the first set of computations, wherein the value stored in the unique location indicates the number of CTAs included in the plurality of CTAs that have completed the first pass of the algorithm, and wherein a subgroup of threads within the first CTA and a subgroup of threads within each of the other CTAs in the plurality of CTAs polls the unique location to determine whether all threads within all CTAs have completed the first set of computations.

10. The computer-readable medium of claim 9, wherein the steps of performing the first set of computations, performing a thread synchronization operation, and writing a value to a unique location within the semaphore array are conducted by one or more threads within each of the other CTAs in the plurality of CTAs.

11. The computer-readable medium of claim 10, further comprising the step of, for each CTA, performing a semaphore wait operation to ensure that all threads within all CTAs have completed the first set of computations.

12. The computer-readable medium of claim 11, further comprising the step of, for the first thread in each CTA, performing a zero semaphore operation to clear another unique location in the semaphore array for another set of computations associated with the algorithm.

13. The computer-readable medium of claim 11, further comprising the step of, for the first thread within each CTA, incrementing a semaphore index to make another unique location within the semaphore array available for a second set of computations associated with the algorithm.

14. The computer-readable medium of claim 13, further comprising the step of, for each CTA, performing a thread synchronization operation across all threads.

15. The computer-readable medium of claim 14, further comprising the step of, for a second plurality of threads within each CTA, performing the second set of computations.

16. A computing device configured to synchronize a plurality of cooperative thread arrays (CTAs) executing an algorithm and including a first CTA, the computing device comprising:

a memory; and a parallel processing unit coupled to the memory, wherein the plurality of CTAs executes within the parallel processing unit and the plurality of CTAs is configured such that:

a first plurality of threads within the first CTA performs a first set of computations associated with a first pass of the algorithm, the first CTA performs a thread synchronization operation across the first plurality of threads to ensure that all threads within the first CTA have completed the first set of computations; and a first thread within the first CTA, incrementing a value stored in a unique location associated with each CTA in the plurality of CTAs within a semaphore array when all threads within the first CTA have completed the first set of computations, wherein the value stored in the unique location indicates the number of CTAs included in the plurality of CTAs that have completed the first pass of the algorithm, and wherein a subgroup of threads within the first CTA and a subgroup of threads within each of the other CTAs in the plurality of CTAs polls the unique location to determine whether all threads within all CTAs have completed the first set of computations.

* * * * *